United States Patent [19]

Hellums et al.

[11] 4,359,680
[45] Nov. 16, 1982

[54] REFERENCE VOLTAGE CIRCUIT

[75] Inventors: James R. Hellums, Carrollton; Michael B. Terry, Dallas, both of Tex.

[73] Assignee: Mostek Corporation, Carrollton, Tex.

[21] Appl. No.: 278,905

[22] PCT Filed: May 18, 1981

[86] PCT No.: PCT/US81/00699

§ 371 Date: May 18, 1981

§ 102(e) Date: May 18, 1981

[51] Int. Cl.³ .............................................. G05F 3/20
[52] U.S. Cl. ..................................... 323/313; 323/315
[58] Field of Search .............................. 323/311–316, 323/907; 179/90 K, 84 BF; 307/297; 330/296, 297

[56] References Cited

U.S. PATENT DOCUMENTS

| | | | |
|---|---|---|---|
| 3,970,875 | 7/1976 | Leehan | 323/270 |
| 4,051,392 | 9/1977 | Rosenthal et al. | 323/315 |
| 4,088,941 | 5/1978 | Wheatley | 323/313 |
| 4,274,061 | 6/1981 | Kraemer | 323/315 |

Primary Examiner—William H. Beha, Jr.

[57] ABSTRACT

A voltage reference circuit (10) produces a reference voltage at output terminals (66, 76). The output reference voltage is substantially independent of variations in the supply voltage, integrated circuit manufacturing processes and temperature. A current reference circuit (30, 32, 34, 36, 38, 56 and 84) produces constant emitter currents in bipolar transistors (40, 70). The $V_{BE}$ of the bipolar transistors (40, 70) is a stable reference due to the constant emitter current. The bipolar transistors (40, 70) are manufactured with similar geometries to eliminate dependence of the reference voltage upon bipolar processing variations. The $V_{BE}$ of the bipolar transistor (40) produces a reference current which is provided to the base terminal of bipolar transistor (70). The $V_{BE}$ of bipolar transistor (70) is further utilized to produce the output reference voltage. A temperature stabilization circuit (58, 82, 86, 90, 92 and 94) is provided with an opposite temperature coefficient from that of the bipolar transistors (40, 70). The temperature stabilization circuit is connected to counteract the influence of the temperature coefficient of the bipolar transistors on the output reference voltage. There is thus established an output reference voltage which is substantially independent of supply voltage, processing and temperature.

8 Claims, 1 Drawing Figure

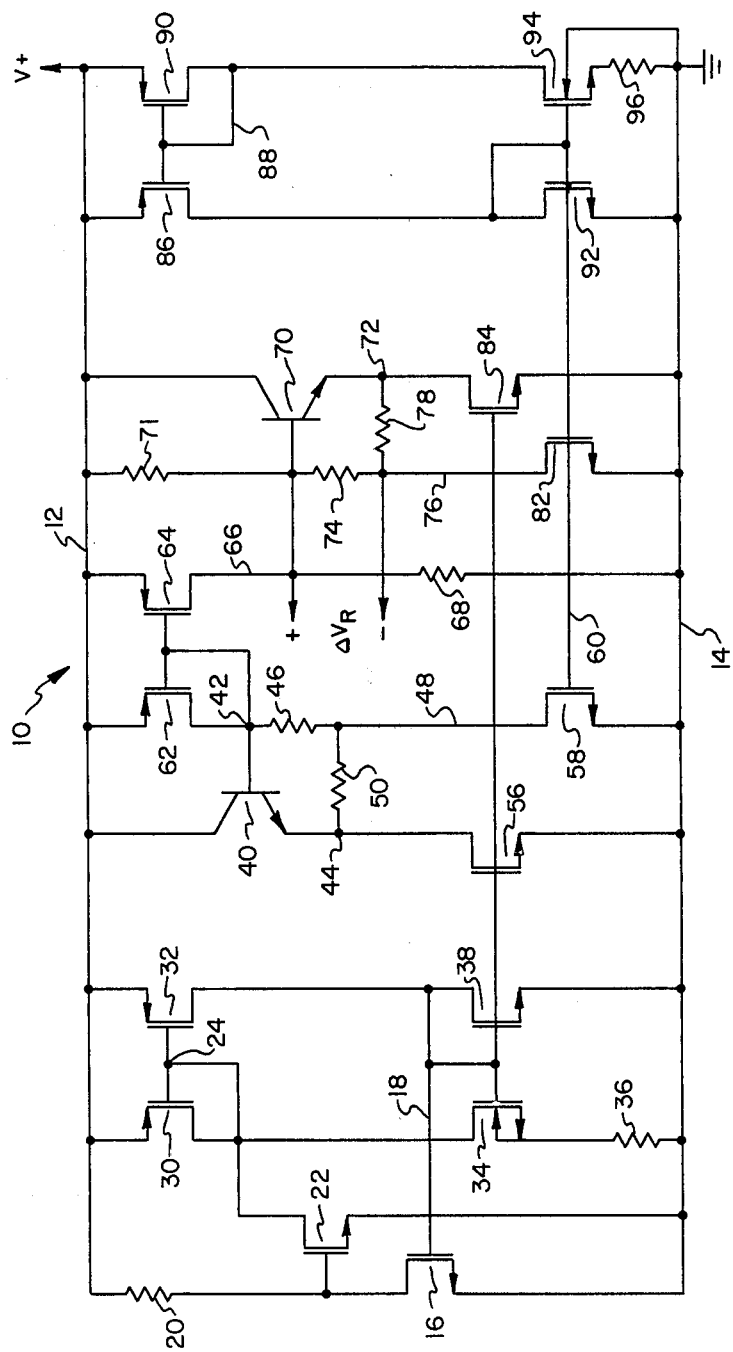

REFERENCE VOLTAGE CIRCUIT

TECHNICAL FIELD

The present invention pertains to circuits for generating a reference voltage and more particularly to such circuits which generate a reference voltage independent of variations such as supply voltage, processing and temperature.

BACKGROUND OF THE INVENTION

Tone dialing circuits have come into widespread use in telephone communications. In tone dialing systems each number is represented by a selected pair of tones. Tone generating circuits must be provided for generating these tones. The first and still widely used approach for this tone generation is by the use of discrete LC circuits. However, such discrete circuits are expensive, consume significant power and occupy a relatively large volume of space. However, such discrete circuits have the advantage of being able to properly function over the wide variations in supply voltage provided to the telephone units from the central station.

Tone dialer integrated circuits have been developed for generating the dial tones for telephone applications. These circuits however, have not been completely successful in meeting all of the requirements for telephone system applications. In particular it is difficult to maintain the absolute value of the amplitude of the tone signal within the narrow ranges permitted under telephone specifications. The amplitude of the tone signal must be sufficient to be detected at the central station but cannot be too great such that it saturates the receiving equipment at the central station. Therefore, a stable reference voltage must be produced for regulating the amplitude of the tone signal. For integrated circuits there are numerous factors which can cause voltage levels in a circuit to change. These include variations in supply voltage, which is a serious problem in telephone applications, processing variations in the manufacturing of the integrated circuits and variations in the operating temperature for the circuit.

In view of the above problems there exists the need for a reference voltage circuit which can produce a reference voltage that is essentially independent of variations in supply voltage, processing and temperature.

SUMMARY OF THE INVENTION

The present invention comprises a circuit for producing a reference voltage. A selected embodiment of this circuit is described as follows. First and second power terminals provide a supply voltage to the circuit. Circuit means are connected to the first and second power terminals for maintaining a first node at a first voltage which is essentially independent on the amplitude of the supply voltage provided that the supply voltage is greater than a preset voltage threshold. A first bipolar transistor has a first of the emitter and collector terminals thereof connected to the first power terminal. A second bipolar transistor has a first of the emitter and collector terminals thereof connected to the first power terminal and the base terminal thereof connected to a second node. Circuit means are connected to the first node, the second power terminal and a second of the emitter and collector terminals of the first bipolar transistor for establishing an essentially constant emitter current through the first bipolar transistor. Additional circuit means are connected to the first node, the second power terminal and a second of the emitter and collector terminals of the second bipolar transistor for establishing an essentially constant emitter current through the second bipolar transistor. A first resistor is connected between the base and emitter terminals of the first bipolar transistor. A second resistor is connected between the base and emitter terminals of the second bipolar transistor. A third resistor is connected between the second node and the second power terminal. Further circuit means are connected to the base terminal of the first bipolar transistor and to the first power terminal for generating a control current which is supplied to the second node. Output terminals are connected to the second resistor for providing the desired reference voltage.

BRIEF DESCRIPTION OF THE FIGURE

For more complete understanding of the present invention and the advantages thereof, reference is now made to the following description taken in conjunction with the accompanying FIGURE which is a schematic illustration of a circuit for generating a reference voltage.

DETAILED DESCRIPTION

Referring now to the FIGURE, a circuit 10 is shown for generating a reference voltage which is illustrated as $\Delta V_R$. The reference voltage produced is a difference voltage. In a preferred embodiment the circuit 10 is fabricated as a portion of a tone dialer integrated circuit which generates dual tone signals for use in telephone applications. However, the circuit 10 is useful in any application where it is necessary to generate a reference voltage which is substantially independent of variations in supply voltage, processing and temperature.

Referring further to the FIGURE circuit 10 includes first and second power terminals 12 and 14 which are respectfully connected to V+ and ground.

Circuit 10 includes a field effect transistor (FET) 16 which has the source terminal thereof connected to power terminal 14 and the gate terminal thereof connected to a node 18. A resistor 20 is connected between power terminal 12 and the drain terminal of transistor 16. A transistor 22 has the gate terminal connected to the drain terminal of transistor 16, the source terminal thereof connected to the power terminal 14 and the drain terminal thereof connected to a node 24. The transistors 16 and 22 together with the resistor 20 comprise a positive feedback startup circuit.

A transistor 30 has the source terminal thereof connected to power terminal 12 and the gate and drain terminals thereof connected to node 24. A transistor 32 has the source terminal thereof connected to power terminal 12, the gate terminal connected node 24 and the drain terminal thereof connected to node 18. A transistor 34 has the drain terminal thereof connected to node 24, the gate terminal thereof connected to node 18 and the source terminal thereof connected to first terminal of a resistor 36. The resistor 36 has the second terminal thereof connected to power terminal 14. Note that the transistor 34 has the P-well thereof connected to its source terminal. A transistor 38 has the source terminal thereof connected to power terminal 14 and the gate and drain terminals connected to node 18. The combination of elements comprising transistors 30, 32, 34 and 38 together with resistor 36 serves to produce a reference voltage for establishing a constant current reference.

A bipolar transistor 40 has the collector terminal thereof connected to power terminal 12, the base terminal thereof connected to a node 42 and the emitter terminal thereof connected a node 44. A resistor 46 is connected between node 42 and a node 48. A resistor 50 is connected between nodes 44 and 48. The resistors 46 and 50 together make up a resistor connected between the base and emitter terminals of transistor 40.

A transistor 56 has the drain terminal thereof connected to node 44, the gate terminal thereof connected to node 18 and the source terminal thereof connected to power terminal 14. A transistor 58 has a drain terminal thereof connected to node 48, the source terminal thereof connected to power terminal 14 and the gate terminal thereof connected to a node 60.

A transistor 62 has the source terminal thereof connected to power terminal 12 and the gate and drain terminals thereof connected to node 42. A transistor 64 has the source thereof connected to power terminal 12, the gate terminal thereof connected to node 42 and the drain terminal thereof connected to a node 66. A resistor 68 is connected between node 66 and a second power terminal 14. A resistor 71 is connected between power terminal 12 and node 66 if a DC bias is required for the reference voltage.

A bipolar transistor 70 has the collector terminal thereof connected to power terminal 12, the base terminal thereof connected to node 66 and the emitter terminal thereof connected to a node 72. A resistor 74 is connected between node 66 and a node 76. A resistor 78 is connected between nodes 72 and 76. The series combination of resistors 74 and 78 form a resistor connected between the base and emitter terminals of transistor 70.

A transistor 82 has the drain terminal thereof connected to node 76, the gate terminal thereof connected to node 60 and the source terminal thereof connected to power terminal 14. A transistor 84 has the drain terminal thereof connected to node 72, the gate terminal thereof connected to node 18 and the source terminal thereof connected to power terminal 14.

The reference voltage $\Delta V_R$ produced by circuit 10 is taken at nodes 66 and 76 which serve as output terminals for circuit 10.

Circuit 10 further includes a transistor 86 which has the source terminal thereof connected to power terminal 12, the gate terminal thereof connected to a node 88 and the drain terminal thereof connected to node 60. A transistor 90 has the source terminal thereof connected to power terminal 12 and the gate and drain terminals thereof connected to node 88. A transistor 92 has the gate and drain terminals thereof connected to node 60 and the source terminal thereof connected to power terminal 14. A transistor 94 has the drain terminal thereof connected to node 88 and the gate terminal thereof connected to node 60. A resistor 96 has a first terminal connected to the source terminal of transistor 94 and a second terminal connected to the power terminal 14. Note that the P-well of transistor 94 is connected to the ground terminal 14.

The circuit 10 basically comprises four sections. The first section is a current reference comprising essentially transistors 30, 32, 34, 38, 56 and 84 together with resistor 36. This section produces an essentially constant current through the emitter terminal of bipolar transistors 40 and 70. A second section of circuit 10 comprises transistors 16 and 22 together with resistor 20. This circuit serves as a positive feedback startup circuit for the constant current section of circuit 10.

A third section of circuit 10 comprises the transistors 40 and 70 together with the associated and interconnected resistors and transistors. This section of circuit 10 produces the desired reference output voltage. The fourth section of circuit 10 comprises essentially transistors 58, 82, 86, 90, 92 and 94 together with resistor 96. This section of circuit 10 provides temperature stabilization for the output reference voltage.

The start-up section of circuit 10 is required if the circuit is operated such that the constant current reference portion can be latched in a non-current conducting mode. The temperature stabilization section of circuit 10 is not required if temperature stabilization is not necessary or if the environment of circuit 10 is such that operation will be conducted only in a limited temperature range.

The resistor 71 is optional to the basic implementation of the circuit 10. Resistor 71 is included in circuit 10 to provide a DC bias for the reference voltage $\Delta V_R$. If such a DC bias is not needed, resistor 71 can be omitted from circuit 10.

Each of the field effect transistors shown in the FIGURE is an enhancement mode device. The transistors conform to standard symbology in that the transistors with inward facing arrows on the source terminals are P-type and those with outward facing arrows on the source terminals are N-type.

The transistors 86, 90, 92 and 94 are fabricated with a geometry which produces very high impedance devices, several orders of magnitude greater than the remaining FET's in circuit 10. These transistors are designed for subthreshold current operation.

Circuit 10 is now operationally described in reference to the FIGURE. The current reference section transistors 30, 32, 34 and 38 are established in a conducting mode such that current flows serially through transistors 30 and 34 and through transistors 32 and 38. The transistors 30 and 32 form a mirror pair such that there is a constant relationship of the currents through these transistors. The circuit consisting of transistors 30, 32, 34 and 38 has a loop gain of greater than unity until a current is established through resistor 36. When a steady state current is established through resistor 36 the loop gain becomes unity. At this condition a reference voltage is established at node 18. This voltage comprises the threshold voltage ($V_T$) of transistor 38 together with the small turn-on voltage of transistor 38. This voltage is maintained at node 18 despite variations in the supply voltage for so long as current flow is maintained through the transistors 30, 32, 34 and 38. Thus, the voltage established at node 18 is essentially independent of the supply voltage provided between power terminals 12 and 14.

In a preferred embodiment of the invention transistor 32 has twice the width of transistor 30 and transistor 34 has twice the width of transistor 38.

Current flow is maintained through these current reference transistors for so long as the supply voltage is above a predetermined threshold which is a function of the manufacture of the integrated circuit. In a typical application the supply voltage must be above approximately 2.0 volts in order to maintain the stable reference voltage at node 18. However, the supply voltage can go substantially above 2.0 volts without significantly altering the voltage at node 18.

The stable voltage at node 18 is provided to the gate terminals of transistors 56 and 84 which function as mirror transistors of transistor 38. In a preferred embodiment the transistors 56 and 84 have twice the width of transistor 38 and thus have twice the current therethrough.

Transistor 56 is connected in series with the collector and emitter terminals of transistor 40 and serves to maintain an essentially constant emitter current through transistor 40. Transistor 84 likewise is connected serially with the emitter and collector terminals of transistor 70 and serves to establish an essentially constant emitter current in transistor 70.

The constant current through transistors 56 and 84 is substantially independent of the supply voltage provided at terminals 12 and 14. Further, the constant current through the transistors is substantially independent of the processing variations for the MOS transistors in the current reference portion of circuit 10.

Should the transistors 30, 32, 34 and 38 be latched in a non-conducting mode node 18 will be a low state which turns off transistor 16. This permits the gate terminal of transistor 22 to be pulled to a high state through resistor 22 and thereby render transistor 22 conductive. When transistor 22 becomes conductive node 24 is pulled to a low voltage state thereby turning on transistors 30 and 32. When the transistors 30 and 32 are turned on node 24 will be pulled to a higher voltage state and the transistors 34 and 38 will be turned on. As node 18 rises in voltage transistor 16 will be turned on to pull down the voltage at the gate terminal of transistor 22 and essentially turn off transistor 22 thereby isolating node 24 from the power terminal 14. Thus, whenever circuit 10 is powered up it is assured that the transistors 30, 32, 34 and 38 will be established in a conductive mode.

When circuit 10 is powered up transistor 40 will be in a conductive state. There will be established a base-to-emitter voltage ($V_{BE}$) between nodes 42 and 44. This voltage will establish a current through the series resistors 46 and 50. The voltage $V_{BE}$ is somewhat dependent upon the emitter current through transistor 40 but since the emitter current is established at a near constant amplitude the voltage $V_{BE}$ will itself be made substantially constant.

The transistors 62 and 64 are connected in a mirror configuration such that there is constant ratio of the current through these transistors. In a preferred embodiment transistor 64 is made five times larger than transistor 52 so that the current through transistor 64 is five times greater than the current through transistor 62. There is thus established a reference control current through transistor 64 and this reference current is a function of the stable $V_{BE}$ of transistor 40. The reference control current through transistor 64 is supplied to node 66.

The bipolar transistor 70 functions in essentially the same manner as transistor 40. The $V_{BE}$ of transistor 70 is essentially stable since the transistor 84 establishes a constant emitter current through transistor 70.

The output reference voltage $\Delta V_R$ is taken at output terminals corresponding to nodes 66 and 76. The transistors 40 and 70 are matched in geometries so that the reference voltage produced at nodes 66 and 76 is substantially independent of the manufacturing processes of the bipolar transistors 40 and 70. Since the voltages $V_{BE}$ for transistors 40 and 70 are substantially independent of the supply voltage the output reference voltage is further decoupled from dependency upon the supply voltage.

It is noted above the resistor 71 may optionally be provided if it is not required that the output reference voltage be independent of the supply voltage.

The $V_{BE}$ of the bipolar transistors 40 and 70 is dependent upon temperature. These transistors have a negative temperature coefficient. Should it be desired to make the output reference voltage substantially independent of temperature an additional section is added to circuit 10. This additional section comprises transistors 58, 82, 86, 90, 92 and 94 and resistor 96. The four transistors 86, 90, 92 and 94, as noted above, are connected to function as a subthreshold current reference. This current reference has a positive temperature coefficient. There is thus produced a temperature compensating voltage at node 60 and this voltage is utilized to drive transistors 58 and 82. The transistors 58 and 82 function as current mirrors of transistor 92. As the temperature of circuit 10 changes the drift of the output reference voltage due to the bipolar transistors 40 and 70 is offset by the temperature coefficient of the circuit comprising transistors 86, 90, 92 and 94. The transistors 58 and 82 are connected to tap on to the center of the base-to-emitter resistors for transistors 40 and 70. Should the temperature compensating circuit not be used a single resistor can be connected between the base and the emitter terminals of the transistors 40 and 70.

The circuit 10 is fabricated with NPN bipolar transistors 40 and 70. It is noted that an equivalent circuit to circuit 10 can be fabricated with PNP bipolar transistors.

In summary the present invention comprises a circuit which produces a reference voltage that is substantially independent of variations in the supply voltage, MOS manufacturing, bipolar manufacturing and temperature.

Although one embodiment of the invention has been illustrated in the accompanying drawing and described in the foregoing detailed description, it will be understood that the invention is not limited to the embodiment disclosed, but is capable of numerous rearrangements, modifications and substitutions without departing from the scope of the invention.

We claim:

1. A circuit for producing a reference voltage comprising:

first and second power terminals for providing a supply voltage to said circuit;

means connected to said first and said second power terminals for maintaining a first node at a first voltage which is essentially independent of the amplitude of said supply voltage provided said supply voltage is greater than a preset voltage threshold;

a first bipolar transistor having a first of the emitter and collector terminals thereof connected to said first power terminal;

a second bipolar transistor having a first of the emitter and collector terminals thereof connected to said first power terminal and the base terminal thereof connected to a second node;

means connected to said first node, said second power terminal and a second of the emitter and collector terminals of said first bipolar transistor for establishing an essentially constant emitter current through said first bipolar transistor;

means connected to said first node, said second power terminal and a second of the emitter and collector terminals of said second bipolar transistor for establishing an essentially constant emitter current through said second bipolar transistor;

a first resistor connected between the base and emitter terminals of said first bipolar transistor;

a second resistor connected between the base and emitter terminals of said second bipolar transistor;

a third resistor connected between said second node and said second power terminal;

means connected to the base terminal of said first bipolar transistor and to said first power terminal for generating a control current which is supplied to said second node; and output terminals connected to said second resistor for providing said reference voltage.

2. The circuit recited in claim 1 wherein said means for maintaining comprises:

a first field effect transistor (FET) having the source terminal thereof connected to said first power terminal and the gate and drain terminals thereof connected together;

a second FET having the source terminal thereof connected to said first power terminal, the gate terminal thereof connected to the gate terminal of said first FET and the drain terminal thereof connected to said first node, a third FET having the drain terminal thereof connected to the drain terminal of said first FET and the gate terminal thereof connected to said first node, a fourth FET having the drain and gate terminals thereof connected to said first node and the source terminal thereof connected to said second power terminal, and a fourth resistor having a first terminal thereof connected to the source terminal of said third FET and a second terminal thereof connected to said second power terminal.

3. The circuit recited in claim 2 including a startup circuit comprising:

a fifth FET having the drain terminal thereof connected to the drain terminal of said first FET and the source terminal thereof connected to said second power terminal, a sixth FET having the gate terminal thereof connected to said first node, the drain terminal thereof connected to the gate terminal of said fifth FET transistor, and the source terminal thereof connected to said second power terminal, and a fifth resistor having a first terminal thereof connected to said first power terminal and a second terminal thereof connected to the gate terminal of said fifth FET.

4. The circuit recited in claim 1 wherein said means for establishing an essentially constant emitter current through said first bipolar transistor comprises a field effect transistor having the gate terminal thereof connected to said first node, the drain terminal thereof connected to the emitter terminal of said first bipolar transistor and the source terminal thereof connected to said second power terminal.

5. The circuit recited in claim 1 wherein said means for establishing an essentially constant emitter current through said second bipolar transistor comprises a field effect transistor having the gate terminal thereof connected to said first node, the drain terminal thereof connected to the emitter terminal of said second bipolar transistor and the source terminal thereof connected to said second power terminal.

6. The circuit recited in claim 1 wherein said means for generating a control current comprises:

a first FET having the source terminal thereof connected to said first power terminal and the gate and drain terminals thereof connected to the base terminal of said first bipolar transistor, and a second FET having the source terminal thereof connected to said first power terminal, the gate terminal thereof connected to the base terminal of said first bipolar transistor and the drain terminal thereof connected to said second node for supplying said control current.

7. The circuit recited in claim 1 wherein said first resistor comprises serially connected fourth and fifth resistors having a junction node and said second resistor comprises serially connected sixth and seventh resistor having a junction node, said circuit including:

a first high impedance FET having the source terminal thereof connected to said first power terminal, the gate terminal thereof connected to a third node and the drain terminal thereof connected to a fourth node, a second high impedance FET having the source terminal thereof connected to said first power terminal and the gate and drain terminals thereof connected to said third node, a third high impedance FET having the drain and gate terminals thereof connected to fourth node and the source terminal thereof connected to said second power terminal, a fourth high impedance FET having the drain terminal thereof connected to said third node and the gate terminal thereof connected to said fourth node, a fourth resistor having a first terminal thereof connected to the source terminal of said fourth FET and the second terminal thereof connected to said second power terminal, a fifth FET having the drain terminal thereof connected to the junction node between said fourth and said fifth resistor, the gate terminal thereof connected to said fourth node and the source terminal thereof connected to said second power terminal, and a sixth FET having the drain terminal thereof connected to the junction node between said sixth and said seventh resistors, the gate terminal thereof connected to said fourth node and the source terminal thereof connected to said second power terminal.

8. A voltage reference circuit comprising:

first and second power terminals for providing a supply voltage to said circuit, a first FET having the source terminal thereof connected to said second power terminal, the gate terminal thereof connected to a first node and the drain terminal thereof connected to a second node, a first resistor having a first terminal thereof connected to said first power terminal and a second terminal thereof connected to said second node, a second transistor having the gate terminal thereof connected to said second node, the source terminal thereof connected to said second power terminal and the drain terminal thereof connected to a third node, a third transistor having the source terminal thereof connected to said first power terminal and the gate and drain terminals thereof connected to said third node, a fourth transistor having the source terminal thereof connected to said first power terminal, the gate terminal thereof connected to said third node and the drain terminal thereof connected to said first node, a fifth transistor having the drain terminal thereof connected to said third node and the gate terminal thereof connected to said first node, a second resistor having a first terminal thereof connected to the source terminal of said fifth transistor and the second terminal thereof connected to said second power terminal, a sixth transistor having the drain and gate terminals thereof connected to said first node and the source terminal thereof connected to said second power terminal, a first bipolar transistor having the collector terminal thereof connected to said first power terminal, the base terminal thereof connected to a fourth node, and the emitter terminal thereof connected to a fifth node, a seventh transistor having the drain terminal thereof connected to said fifth node, the gate terminal thereof connected to said first node and the source terminal thereof connected to said second power terminal, a third resistor having a first terminal thereof connected to said fourth node and a second terminal thereof connected to a sixth node, a fourth resistor having a first terminal thereof connected to said sixth node and a second terminal thereof connected to said fifth node, an eighth transistor having the source terminal thereof connected to said first power terminal and the gate and drain terminal thereof connected to said fourth node, a ninth transistor having the drain terminal thereof connected to said sixth node, the gate terminal thereof connected to a seventh node and the source terminal thereof connected to said second power terminal, a tenth transistor having the source terminal thereof connected to said first power terminal, the gate terminal thereof connected to said fourth node and the drain terminal thereof connected to an eighth node, a fifth resistor having a first terminal thereof connected to said eighth node and a second terminal thereof connected to said second power terminal, a second bipolar transistor having the collector terminal thereof connected to said first power terminal, the base terminal thereof connected to said eighth node and the emitter terminal thereof connected to a ninth node, a sixth resistor having a first terminal thereof connected to said eighth node and a second terminal thereof connected to a tenth node, a seventh resistor having a first terminal thereof connected to said ninth node and a second terminal thereof connected to said tenth node, a eleventh transistor having the drain terminal thereof connected to said tenth node, the gate terminal thereof connected to said seventh node and the source terminal thereof connected to said second power terminal, a twelfth transistor having the drain terminal thereof connected to said ninth node, the gate terminal thereof connected to said first node and the source terminal thereof connected to said second power terminal, a thirteenth transistor having the source terminal thereof connected to said first power terminal, the gate terminal thereof connected to an eleventh node and the drain terminal thereof connected to said seventh node, a fourteenth transistor having the source terminal thereof connected to said first power terminal and the gate and drain terminals thereof connected to said eleventh node, a fifteenth transistor having the drain and gate terminals thereof connected to said seventh node and the source material thereof connected to said second power terminal, a sixteenth transistor having the drain terminal thereof connected said eleventh node and the gate terminal thereof connected to said seventh node, an eighth resistor having a first terminal thereof connected to the source terminal of said sixteenth transistor and a second terminal thereof connected to said second power terminal, and output terminals connected to said eighth and said tenth nodes for providing said reference voltage.

* * * * *